Nov. 19, 1957  B. BARÉNYI  2,813,436
STEERING WHEELS

Filed June 2, 1954  2 Sheets-Sheet 1

Nov. 19, 1957  B. BARÉNYI  2,813,436
STEERING WHEELS
Filed June 2, 1954  2 Sheets-Sheet 2
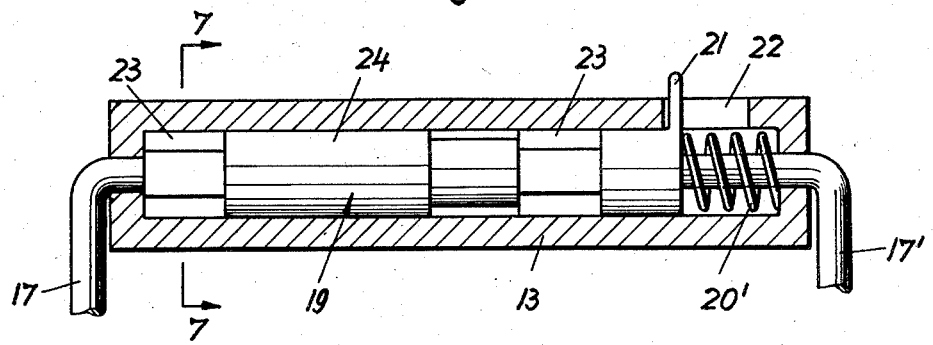
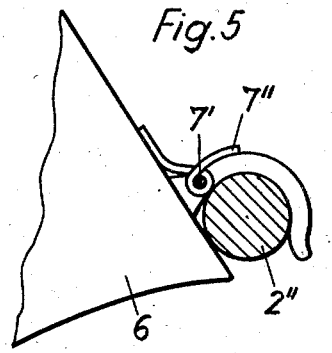
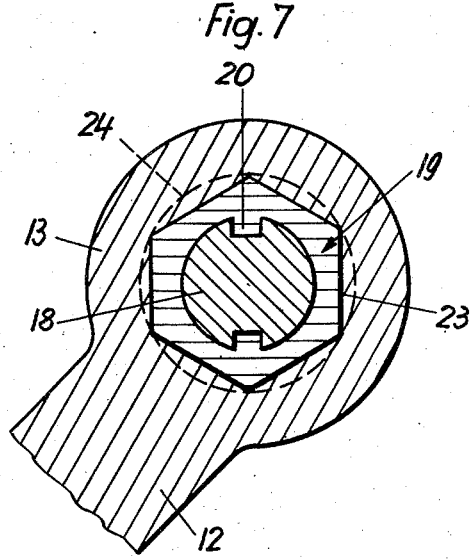

United States Patent Office 2,813,436
Patented Nov. 19, 1957

2,813,436

STEERING WHEELS

Bela Barényi, Stuttgart-Rohr, Germany, assignor to Daimler-Benz Aktiengesellschaft, Stuttgart-Untertürkheim, Germany Application June 2, 1954, Serial No. 434,043

Claims priority, application Germany July 2, 1953

5 Claims. (Cl. 74—555)

The present invention relates to steering wheels, and is particularly directed to steering wheels for motor vehicles wherein the steering wheel can be tilted relative to the supporting column to facilitate getting into and out of the driver's seat.

Heretofore, steering wheels have been mounted on motor vehicles in a manner permitting the tilting thereof about an axis which is horizontal when the steered wheels are directed straight-ahead thereby to provide greater clearance between the steering wheel and the driver's seat for facilitating getting into and out of the driver's seat. In such existing arrangements, the horizontal tilting axis of the steering wheel, with the steered wheels of the vehicle directed straight-ahead, is located at the upper edge of the steering wheel hub, and the steering wheel, when in its operative or steering position, is supported at its center on a relatively wide surface which is provided on the face of the steering wheel hub. Furthermore, in the existing arrangement of the kind mentioned above, the tilting axis of the steering wheel coincides with a transversely extending chordal spoke of the steering wheel which connects the rim of the steering wheel to the central portion which is tiltably mounted on the hub.

Experience has shown that the above described existing steering wheels have several disadvantages, in that, the open space defined above the tilting axis or chordal spoke of the steering wheel within the confines of the rim is too small to provide adequate vision of the instruments mounted upon the dashboard, and further, the driver is induced to grasp the chordal spoke, rather than the rim, of the steering wheel for manipulating the latter and the relatively high position of the chordal spoke results in the raising of the driver's arms so that the weight thereof is unevenly distributed on the chordal spoke above the center line of the steering wheel and results in unstable, involuntarily irregular steering or driving of the vehicle. Further, it has been established that steering with the arms in a raised position, as with the existing tiltable steering wheels, results in an inadequate grip upon the steering wheel and excessive fatigue. Finally, the wide end surface of the steering wheel hub against which the tiltable steering wheel is secured in its operative position, is usually at or near the plane of rotation of the steering wheel so that, even when the wheel is tilted upwardly, the wide end surface of the hub remains to restrict the clearance or space through which the driver is required to pass in getting into and out of the driver's seat.

Accordingly, it is an object of the present invention to avoid the above mentioned disadvantages of the existing tiltable steering wheels.

Specifically, it is an object of the present invention to provide a tiltable steering wheel which, when in its upwardly tilted position, facilitates getting into and out of the driver's seat, and which includes a chordal spoke substantially below the axis of rotation of the wheel, when the steering wheel is in its operative position and the steered wheels are directed straight ahead so that, even when the driver manipulates the steering wheel by grasping the chordal spoke, the driver's arms are in lowered and relaxed positions to avoid or minimize driving fatigue, and so that a wide, unobstructed opening is provided through the entire upper portion of the steering wheel and around the tilting axis thereof for affording improved visibility of the instruments on the dashboard.

In accordance with the invention, the tilting axis of the steering wheel is disposed above the center of the steering wheel, with the wheel in its operative position and the steered wheels directed straight head, and a chordal spoke extends transversely across the wheel substantially below the center thereof and connects to the rim while parallel connecting members extend from the spoke to the hinge axis of the steering wheel either in the plane of rotation of the steering wheel or in a plane which is parallel thereto.

In a preferred embodiment of the invention, the steering wheel hub is inclined upwardly from its supporting column, when the steered wheels are directed straight-ahead, and the steering wheel is tiltable about an axis extending through the uppermost end of the inclined hub with an arrangement being provided therein for securing the wheel in its operative or steering position, so that, when the wheel is tilted upwardly, the upwardly inclined hub provides additional clearance above the driver's seat for further facilitating getting into and out of the latter.

The above, and other objects, features and advantages of the invention, will be apparent in the following detailed description of illustrative embodiments thereof, particularly when the detailed description is read in connection with the accompanying drawings showing the illustrative embodiments, and wherein:

Fig. 5 is a fragmentary detail view, on an enlarged scale, of a wheel securing device included in the embodiments of Figs. 1 and 2;

Fig. 6 is a longitudinal sectional view along the tilting axis of a steering wheel of the kind shown in Figs. 3 and 4; and Fig. 7 is a sectional view taken along the lines 7—7 of Fig. 5, but on an enlarged scale.

Figure 1:
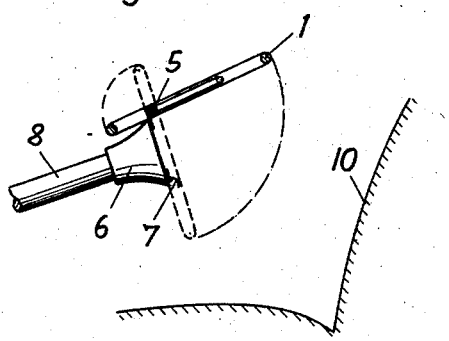
Fig. 1 is a diagrammatical, side elevational view of a tiltable steering wheel embodying the present invention, with the wheel being shown in full lines in its upwardly tilted position and in broken lines in its operative or steering position.
Figure 2:
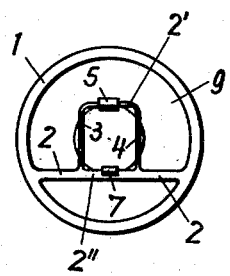
Fig. 2 is a plan view of the steering wheel of Fig. 1 viewed in a direction normal to the plane of rotation of the wheel in its operative position.

Referring to the drawings in detail, and initially to Figs. 1 and 2 thereof, a steering wheel embodying the present invention is there-illustrated and includes a circular rim 1 having a chordal or transverse spoke extending thereacross at a location spaced substantially from the center of the circular rim and made up of two outer spoke portions 2 and a central portion 2″. Parallel connecting members 3 and 4 extend from the inner ends of spoke portions 2″ and are joined together, at the ends remote from the chordal spoke, by a cross member 2‴ which extends parallel to the chordal spoke and is spaced from the center of rim 1 at the side of the center opposite to the chordal spoke.

The above described steering wheel is mounted, by the connecting portion 2‴, in a hinge barrel 5 which is disposed at the upper edge of the face of a wheel hub 6 carried by a supporting column 8, when the hub and column are in the neutral rotational position corresponding to the straight ahead disposition of the steered wheels. The steering wheel is secured in its operative position, shown in broken lines in Fig. 1, lying in a plane which is normal to the axis of rotation of hub 6, by a suitable conventional latch 7 which is only diagrammatically represented in Figs. 1 and 2 of the drawings. When the latch 7 is released, the steering wheel can be tilted upwardly to the full line position shown in Fig. 1 thereby to increase the clearance available above the driver's seat 10 for facilitating getting into and out of the driver's seat. Fig. 5 illustrates, merely by way of example, a latch device suitable for use in the embodiment of Figs. 1 and 2. This latch device includes a hook-shaped latch 7 pivoted, as at 7', on the face of hub 6 to engage over central spoke portion 2" of the steering wheel when the latter is in its operative position, and a spring 7" urging the latch to its illustrated position of engagement.

As seen in Fig. 2, wherein the steering wheel is shown in the position occupied thereby when the steered wheels are directed straight ahead, the chordal spoke portions 2 are then disposed well below the center of the wheel so that an unobstructed opening 9 is provided within the rim 1 above, and substantially around, the hub 6 thereby to permit viewing through the relatively large opening 9 of instruments upon the dashboard. Further, by reason of the relatively low disposition of the chordal spoke portions 2, even when the driver grasps the spoke portions 2 for the purpose of manipulating the wheel, the weight of the driver's arms applied to the chordal spoke only negligibly influence the steering, and since the driver's arms are then close to his body, safe, practical driving, without fatigue, is thereby assured.

Figure 3:
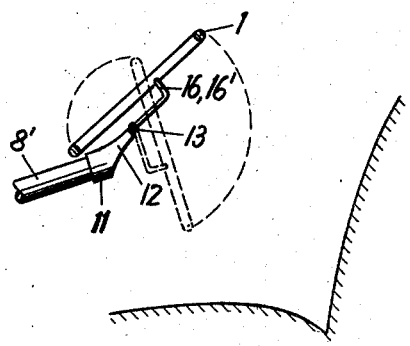
Fig. 3 is a diagrammatic side, elevational view, similar to Fig. 1, but showing another embodiment of the invention.

While the above described steering wheel and mounting advantageously improves the field of vision through the steering wheel, as well as the ease with which the chordal spoke can be grasped to substantially reduce driving fatigue, it is apparent in Fig. 1 that, with the wheel in its upwardly tilted position, the lower portion of hub 6 still represents an annoying obstruction during getting into and out of the driver's seat. Accordingly, in a preferred embodiment of the invention, illustrated in Figs. 3 and 4, the steering wheel hub is formed in a manner to further increase the clearance above the driver's seat when the steering wheel is in its upwardly tilted position. Referring to Fig. 3, it will be seen that the hub 11 mounted on a steering or supporting column 8' is of relatively small diameter and includes an extension 12 which is inclined relative to the axis of the column 8' so as to incline upwardly as shown in Fig. 3, when the steered wheels are directed straight-ahead. At its upper or free end, extension 12 is formed with a hinge barrel 13 having its axis extending horizontally when the steered wheels are directed straight ahead and forming the tilting axis for the steering wheel. Unlike the embodiment of Figs. 1 and 2, wherein a latch 7 is provided on the hub at a location spaced from the tilting axis for securing the wheel in its operative position, in the embodiment of Figs. 3 and 4, the hinge barrel 13 serves the dual function of defining the tilting axis for the steering wheel and of housing a device for securing the wheel in its operative position, shown in broken lines in Fig. 3, and wherein the wheel is disposed in a plane which is normal or perpendicular to the axis of rotation of column 8' and hub 11.

Figure 4:
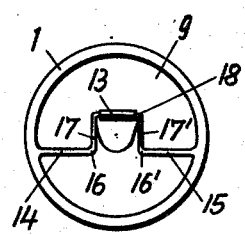
Fig. 4 is a plan view, similar to Fig. 2 but showing the steering wheel of Fig. 3.

While the steering wheel mounted in the manner illustrated in Figs. 3 and 4 may have the general configuration of the wheel illustrated in Fig. 2, that is, with a continuous chordal spoke connected at its opposite ends to the wheel rim 1, the tiltable wheel of the embodiment illustrated in Figs. 3 and 4 preferably includes two spoke portions 14 and 15 which extend inwardly toward each other from the circular rim 1 along a chord of the latter spaced from the center of the rim. At their inner ends, the spoke portions 14 and 15 are respectively joined to backwardly or downwardly extending sections 16 and 16' which are integral with parallel members or sections 17 and 17' lying in a plane parallel to that of the circular rim and connected together, at their ends remote from the spoke portions, by a cross member or connecting piece 18 which extends through the hinge barrel 13 to define the tilting axis of the wheel and which is spaced from the center of the wheel at the side of the latter opposite to the chord of the spoke portions 14 and 15.

While any suitable device may be employed for the purpose of securing the wheel in its operative position, shown in broken lines on Fig. 3, and for releasing the crosspiece 18 of the wheel structure, to permit tilting of the wheel to the position shown in full lines on Fig. 3, a particular construction capable of performing the necessary functions is illustrated in Figs. 6 and 7, merely by way of example.

As seen in Figs. 6 and 7, a sleeve, generally identified by the numeral 19, is provided on crosspiece 18 within the hinge barrel 13 carried by hub 12. Sleeve 19 is slidable axially along crosspiece 18 and is keyed or splined to the latter, as at 20 (Fig. 7), to prevent rotation of the sleeve relative to the crosspiece. Sleeve 19 is urged axially in one direction on crosspiece 18 by a compression spring 20 (Fig. 6), and a finger 21 projects from the sleeve through a suitable opening 22 in hinge barrel 13 to provide for manual actuation of the sleeve 19 axially along crosspiece 18 in opposition to the force exerted by spring 20'. The outer surface of sleeve 19 is provided with sections 23 of non-circular cross section, for example, of hexagonal configuration, as shown in Fig. 7, and with sections 24 having circular cross sections. The internal bore of the hinge barrel 13 is also formed with corresponding sections of non-circular and circular cross sections, respectively, receiving the sections 23 and 24 when the sleeve 19 is urged to the left, as viewed in Fig. 6, by the spring 20' so that the close engagement of the non-circular sections 23 of the sleeve in the correspondingly shaped non-circular sections of the internal bore of barrel 13 prevents rotation of sleeve 19 and of crosspiece 18 of the wheel structure within barrel 13 thereby to secure the steering wheel in its operative position. As seen in Fig. 7, the non-circular sections 23 of sleeve 19 have a maximum diametrical dimension which is no greater than the diameter of the circular sections 24 of the sleeve so that sleeve 19 can be displaced to the right, as viewed in Fig. 6, by axial manipulation of finger 21, to dispose the non-circular sections 23 of the sleeve within the circular sections of the bore of barrel 13 whereby sleeve 19 is then free to rotate within the barrel to permit upward tilting of the steering wheel to the position shown in full lines on Fig. 3.

The embodiment of the invention illustrated in Figs. 3 and 4 not only provides the relatively large, unobstructed opening 9 through the wheel for improved visibility of the instruments on the dashboard and the low positioning of the spoke portions 14 and 15 to avoid driver fatigue, but also further increases the clearance above the driver's seat, as shown in Fig. 3, when the wheel is tilted upwardly, by reason of the particular configuration of the hub 11 and extension 12 described above.

While illustrative embodiments of the invention have been described in detail herein and shown in the accompanying drawings, it is to be understood that the invention is not limited to these precise embodiments, and that various changes and modifications may be effected therein, by one skilled in the art, without departing from the scope or spirit of the invention as defined in the appended claims.

What is claimed is:

1. In a steering mechanism, particularly for motor vehicles; the combination of a rotatable hub, means defining a tilting axis on said hub lying in a plane normal to the axis of rotation of said hub and extending horizontally at a location disposed substantially above said axis of rotation when said hub is positioned for steering a straight-ahead course, and a steering wheel including a circular rim and members including aligned chordal spokes extending from said rim and mounting the latter on said tilting axis so that said rim is swingable between an operative position, wherein said rim is concentric with said axis of rotation and in a plane normal to the latter, and an upwardly tilted position, said members and chordal spokes being disposed so that, with said rim in its operative position and said hub positioned for steering a straight-ahead course, said spokes define between said rim and hub a completely unobstructed major segment of the circle within said rim above the center thereof extending upwardly from the level of the lower edge of said hub.

2. In a steering mechanism, particularly for motor vehicles; the combination of a rotatable hub, means defining a tilting axis on said hub lying in a plane normal to the axis of rotation of said hub and extending horizontally at a location disposed substantially above said axis of rotation when said hub is neutrally positioned for steering a straight-ahead course, and a steering wheel tiltably mounted on said tilting axis of the hub for movement between an operative position concentric with, and normal to, said axis of rotation and an upwardly tilted position, said steering wheel including a circular rim, a tilting axle mounted in said means defining a tilting axis on the hub and extending chordally within said rim at a location at one side of the center of said rim, said tilting axle terminating at its opposite ends substantially short of said rim, parallel connecting members extending from the opposite ends of said tilting axle in the direction toward the other side of said center of the rim and in a plane parallel to that of said rim, and aligned chordal spokes extending outwardly from the ends of said connecting members remote from said tilting axle to said rim at locations to said other side of the rim so that, when said steering wheel is in its operative position and said hub is neutrally positioned, said spokes define an unobstructed major circular segment between said rim and hub while said spokes are at relatively low positions to facilitate grasping thereof for reducing steering fatigue.

3. In a steering mechanism, particularly for motor vehicles; the combination according to claim 2, further comprising means for securing said steering wheel with respect to said hub in said operative position of the wheel.

4. In a steering mechanism, particularly for motor vehicles; the combination according to claim 3, wherein said outwardly extending spokes are joined, at their inner ends, by a spoke continuation extending across the lower portion of said hub when the latter is neutrally positioned and the steering wheel is in its operative position.

5. In a steering mechanism, particularly for motor vehicles; the combination according to claim 3, wherein said hub includes a relatively flat extension inclined away from said axis of rotation of the hub in the direction toward said tilting axis, said tilting axis lying within the free end of said hub extension, and wherein said securing means are disposed at said tilting axis so that, when said steering wheel is tilted upwardly, the space below said tilting axis is substantially unobstructed.

References Cited in the file of this patent

UNITED STATES PATENTS

| | | |
|---|---|---|
| Re. 14,684 | Prindle | July 8, 1919 |
| D. 118,503 | Pariott | Jan. 9, 1940 |
| 1,219,759 | Miller | Mar. 20, 1917 |
| 1,272,582 | Vincent | July 16, 1918 |
| 1,457,733 | Frederickson | June 5, 1923 |
| 1,621,206 | Kacziba | Mar. 15, 1927 |
| 2,255,813 | Robbins et al. | Sept. 16, 1941 |
| 2,518,175 | Pinardi | Aug. 8, 1950 |
| 2,683,996 | Rabe | July 20, 1954 |